May 23, 1950     W. I. SWEET     2,509,113
FISHING SPEAR
Filed Jan. 28, 1948
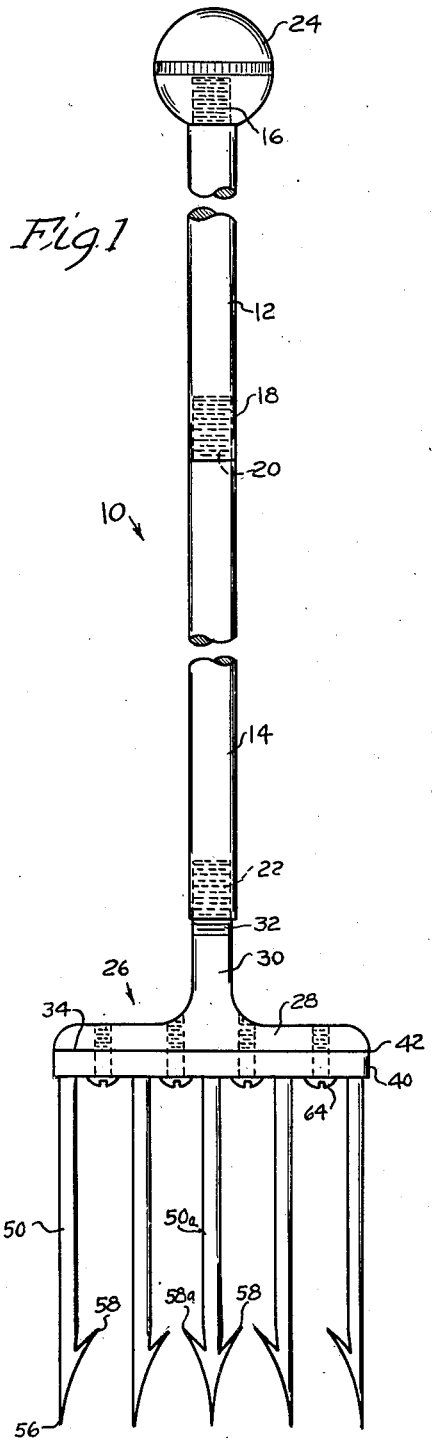
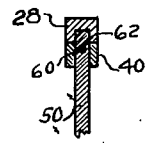
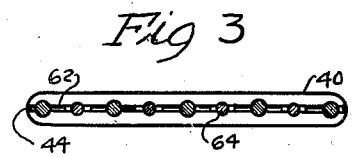
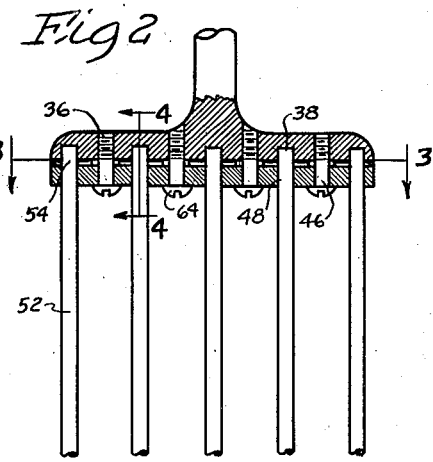
INVENTOR.
WILLIAM I. SWEET
BY
Attorney Patented May 23, 1950

2,509,113

UNITED STATES PATENT OFFICE 2,509,113

FISHING SPEAR

William Irvin Sweet, Wayzata, Minn.

Application January 28, 1948, Serial No. 4,771

2 Claims. (Cl. 43—6)

My invention relates to improvements in a fishing spear of the type used by anglers who engage in ice fishing or in otherwise catching fish by means of a lance like member.

A popular winter sport in cold climates is in fishing through a hole in the ice that covers natural bodies of water. One form of the practice is to cut a hole through the ice to the water body so as to provide direct access to the water. A small enclosure such as a tent or portable fishing house is mounted over the hole in the ice and forms a protection for the angler as well as enclosing him in a dark area so that the only light which enters the enclosure is that which is refracted from the ice and water body. A suitable form of bait is suspended into the water for a short distance below the surface thereof to attract fish to the area immediately adjacent the hole in the ice. When the fish approaches the surface of the water it becomes readily visible since the angler's background is dark and the source of light entering the enclosure is through the ice and water, thus the fish can be attacked and caught with a lance or spear. The spear used for these purposes generally consists of a staff provided with a sharp point at its lower end and means for attaching a rope to the upper end. The spear is thrown or driven at the fish so as to impale the fish on the sharp point. Great skill is required in handling the spear otherwise it will be driven into the ice around the periphery of the hole, or it is likely to be driven into the water and against rocks on the lower surface thereof.

Another form of fishing with a device of this nature, where the practice is lawful, is for the angler to stand on the bank of a flowing stream and throw or lunge the spear at a fish when it swims close to the bank.

In either of these practices the spear must be a well balanced device so that it can be accurately handled, and it must also be capable of withstanding rough usage such as will occur when it is driven against rocks or in the surface of the ice, either of which practices is likely to cause damage to the sharp point.

In the present invention a spear is provided which consists of a staff formed of a plurality of jointed members, and a head portion formed of a plurality of barbed tines, wherein each of the tines is independently removable from the head portion for replacement in the event of damage. The tines are arranged on the head portion in laterally spaced relation to each other so that a fish is generally impaled on two or more tines. Moreover, each of the tines is provided with a rearwardly extending barb that is arranged to cooperate with an adjacent tine so as to hold the fish after it has been impaled.

An object of my invention is to provide a fishing spear for use by anglers, composed of a staff portion and a head portion, each of which is formed of separable parts.

Another object is to provide in a fishing spear a head portion that supports a plurality of barbed tines arranged with relation to each other so as to hold a fish on the barbs of two or more tines.

A further object is to provide a means of mounting the tines of a fishing spear within a head portion in such a manner that each tine is securely held and yet can be easily replaced in the event of damage.

Other and further objects may become apparent from the following description and claims, and in the appended drawings in which:

Fig. 1 is an elevation of a fishing spear used by anglers;

Fig. 2 is a cross-section taken through the head of the spear shown in Fig. 1 to show the manner in which the tines are mounted therein;

Fig. 3 is a section taken on the lines 3—3 of Fig. 2; and,

Fig. 4 is a section taken on the lines 4—4 of Fig. 2.

Referring now to the several views of the drawings, the invention will be described in detail. Referring particularly to Fig. 1, a fishing spear indicated by general reference numeral 10 is composed of a staff formed of a plurality of rods 12 and 14, each of which is provided with a male and female thread on its opposite ends, as indicated at 16, 18, 20 and 22, so as to enable the rods to be joined one to another. A spherical member 24 is mounted on threaded portion 16 of rod 12 to provide a smooth gripping surface and also a means by which a rope, not shown, may be tied about the upper end of rod 12.

A cross-head indicated by general reference numeral 26 is composed of a member 28 having a rod 30 extending therefrom, which is threaded at 32 for junction with the threaded portion 22 of rod 14. Member 28 is provided with a lower flat surface 34. As best shown in Fig. 2, member 28 also has a plurality of threaded passages 36 which extend from the lower surface 34 through the upper surface of the member. Member 28 also has extending upwardly from its lower surface 34 a plurality of sockets 38.

Cross-head 26 is also composed of a second member 40 having a flat upper surface 42 that is adapted to cooperate with the flat lower surface 34 of member 28. As best shown in Figs. 2 and 3, a groove 44 extends across the entire upper surface 42 of member 40. Member 40 is also provided with a first set of vertical passages 46 and a second set of vertical passages 48.

A plurality of tines 50 are composed of linear shafts 52, each of which has a cylindrical butt end 54 that is adapted to extend through passage 48 of member 40 into socket 38 of member 28. At their other ends, each tine member 50 is provided with a sharp point 56 and at least one rearwardly extending barb 58. As clearly shown in Fig. 1, the center tine 50a has extending rearwardly from its pointed portion, barbs 58 and 58a, on either side of shaft 52.

As will be clearly evident in Figs. 2, 3 and 4, each of the tine members 50, adjacent its butt extremity 54, has a transverse aperture 60 through which extends a pin 62. The several pins 62 are cylindrical and of a dimension that they will fit within the transverse groove 44 in the upper surface of cross-member 40. A plurality of threaded bolts 64 extend through passages 46 in member 40 and are threadedly engaged in passages 36 of member 28 to secure the two cross-members in rigid relationship with each other.

The mode of assembling and use of the device will now be explained in detail. The several rods 12 and 14 are threadedly joined one to another through their several threaded connections and form a linear staff. A particular advantage results from forming the staff in this manner in that it may be easily carried when disjointed and where desired, rod 12 in place of being connected to rod 14 may be threadedly joined with any other form of tool such as a chisel or pick for cutting a hole in the ice prior to the commencement of the fishing operation. The head portion 26 may be assembled by inserting the shafts 52 of the several tines 50 with their butt ends 54 through the apertures 48 of member 40, whereafter the several pins 62 are inserted through apertures 60 and the tines pulled downwardly until the pins 62 are engaged in groove 44. Thereafter, with the lower portion assembled, it is joined to the upper member 28 and the several bolts 64 are locked in place. The upper ends of the butt portions 54 thus will extend into sockets 38 to form an extremely rigid connection about the butt ends 54 of the tines.

With the structure now assembled, head portion 26 is threadedly joined with rod 14 through their respective threaded connections and the spear is ready for use. To avoid loss of the spear it is advisable that a suitable rope, not shown, be tied about the upper end of the spear beneath the spherical member 24. When actually in use, an angler holds a line supporting on its end a suitable form of bait in one hand and the spear 10 in the other hand. When a fish approaches, the spear is lunged or thrown at the fish and preferably in such a manner as to hit the fish directly back of the head and along the spine. The sharp points 56 of the several tine members will impale the fish, and by arrangement of the several barbs 58 and 58a, it will be apparent that in general a fish will be impaled by one or more tines and in such a manner that the barb of an adjacent tine will aid in holding the fish against escape. With the fish thus securely held on the end of the spear, it is withdrawn from the water and the fish removed.

My invention is defined in the terms of the appended claims.

I claim:

1. A fishing spear embodying a staff and a tine, and means for removably securing the tine to the staff comprising a first cross member secured to one end of the staff, a second cross member secured to one end of the tine, said second member having a groove formed in its upper surface and a passageway which bisects said groove and is adapted to receive a portion of said tine, said first member having an aperture in alignment with the passage in said second member for receiving another portion of said tine, fastening means carried by said tine and cooperable with the groove in said second member to secure the tine against rotation relative to said second member, and means for securing said members with relation to each other to lock said tine between said members.

2. A fishing spear embodying a staff and a plurality of tine members each formed of a shaft having a barbed point, means for mounting the tines with relation to the staff comprising a first cross member secured to one end of the staff, a second cross member cooperable with the first member and having a groove formed in its cooperable surface and a plurality of passages bisecting said groove at spaced apart distances from each other, a plurality of tine members, a butt portion of each of said tine members extending through each of said passages in said second cross member, each of said tine members having a transverse aperture adjacent the butt end thereof, a pin extending through each of said apertures which is adapted to be held in said groove to prevent rotation of the tine relative to said second member, and means for securing said second cross member to said first cross member in such a manner as to secure said tines between said cross members.

WILLIAM IRVIN SWEET.

REFERENCES CITED

The following references are of record in the file of this patent:

UNITED STATES PATENTS

| Number | Name | Date |
|---|---|---|
| 172,312 | Hedges | Jan. 18, 1876 |
| 1,302,457 | Ureck | Apr. 29, 1919 |
| 1,310,452 | Sliwinski | July 22, 1919 |